March 1, 1932. E. H. STEEDMAN 1,847,450

LUBRICATING SYSTEM FOR PISTON MACHINES

Original Filed June 2, 1927

INVENTOR:
EDWIN H. STEEDMAN.
BY Bakewell Church
ATTORNEYS.

Patented Mar. 1, 1932

1,847,450

UNITED STATES PATENT OFFICE

EDWIN H. STEEDMAN, OF ST. LOUIS, MISSOURI, ASSIGNOR TO CURTIS MANUFACTURING COMPANY, OF WELLSTON, MISSOURI, A CORPORATION OF MISSOURI

LUBRICATING SYSTEM FOR PISTON MACHINES

Original application filed June 2, 1927, Serial No. 196,104. Divided and this application filed July 2, 1928. Serial No. 289,854.

This invention relates to a novel lubricating apparatus for compressors, internal combustion engines and similar machines of the kind that comprise a reciprocating piston joined by a connecting rod to a crank arm or the like on a rotating shaft, this present application being a division of my pending application for patent Serial No. 196,104, filed June 2, 1927, for lubricating systems for piston machines.

The object of my present invention is to provide a lubricating apparatus having the feaures or characteristics described in my said pending application for patent, in which the means used to supply oil to the centrifugal pressure chamber of the rotatable member on the crank shaft, consists of a rotatable ring, partly submerged in the oil in the crank case of the machine.

Figure 1 of the drawings is a side elevational view, partly broken away, of the crank case of a two cylinder compressor equipped with a lubricating apparatus constructed in accordance with my present invention.

Figure 1:
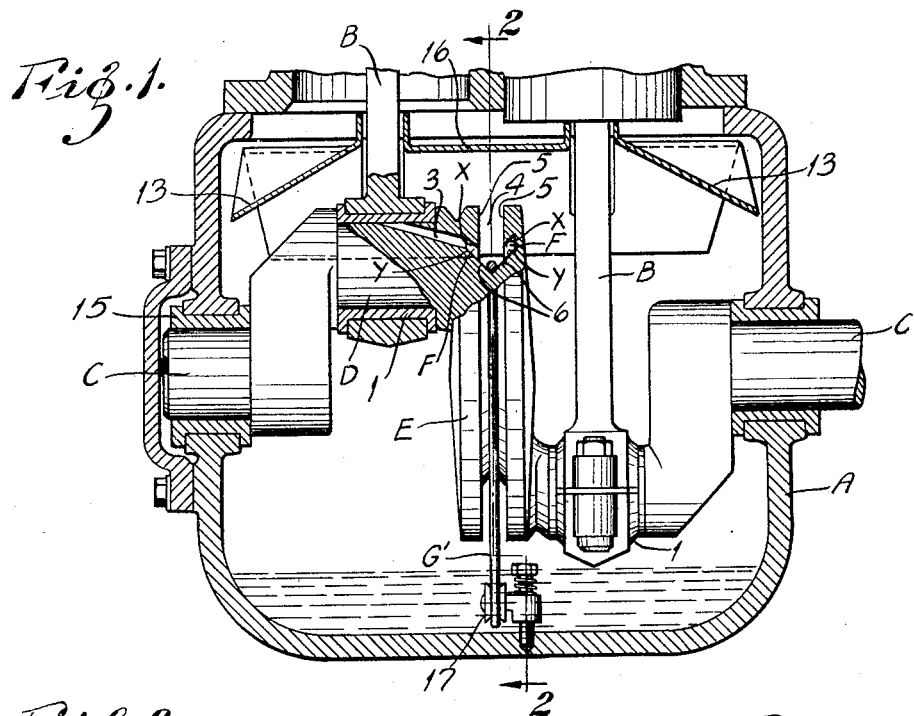
Figure 2:
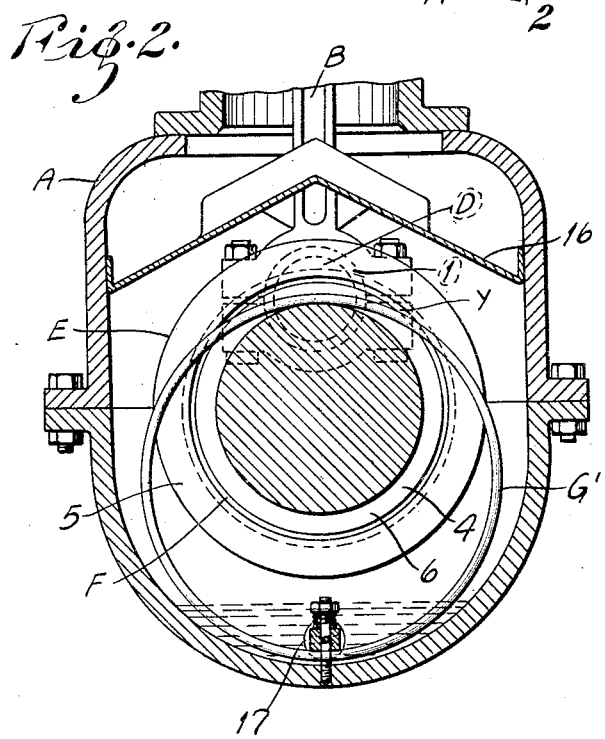
Figure 2 is a transverse sectional view, taken on the line 2—2 of Figure 1.

In the accompanying drawings which illustrate the preferred form of my present invention, A designates the crank case of a compressor, internal combustion engine, reciprocating pump or other machine equipped with one or more cylinders whose pistons are joined by connecting rods B to the crank shaft C of the machine. The lubricating apparatus herein illustrated and described is used to supply oil to the bearings 1 that surround the crank pins D on the crank shaft, and is of such design that it will positively supply an adequate quantity of oil to said crank pins without liability of causing the cylinders of the machine to receive an excessive supply of oil when the machine is operated at a high speed. Said lubricating apparatus is designed so that oil will be fed to each of the bearings 1 or to its co-operating crank pin D by pressure produced by centrifugal force. As shown in Figure 1, the crank shaft C has associated with same a rotatable member E that is provided with oil chambers F from which oil ducts or passageways 3 lead to the outer surfaces of the crank pins D. The member E can be formed integral with the crank shaft, or it can be detachably connected to the crank shaft, and when the invention is embodied in a multi-cylinder machine, as shown in Figure 1, the member E can consist of a substantially disk-shaped portion on the crank shaft that is located between adjacent connecting rods B and which forms portions of the crank arms on the crank shaft that carry the crank pins D. The member E is preferably arranged at right angles to the longitudinal axis of the crank shaft, and the peripheral edge of said member is bifurcated so as to form a slot 4 in same that has two parallel, vertically-disposed side walls 5. Annular grooves that are formed in the side walls 5 of the slot 4 preferably in concentric relation with the axis of rotation of the crank shaft C, constitute centrifugal pressure chambers from which oil is forced through the ducts 3 to the crank pins. The chambers or grooves F may be constructed in various ways without departing from the spirit of my invention. They are herein illustrated as having opposed, concentrically arranged, inwardly inclined walls $x$ and $y$ disposed at such an angle to the vertical surfaces 5 on the member E in which said grooves are formed that the centrifugal force produced by the rotary movement of the member E will produce pressure in said chambers F that causes the oil in same to be fed to the ducts or passageways 3 that lead to the crank pins D. When the crank shaft is set in operation any oil that may be on the vertically-disposed surfaces 5 of the member E will be thrown radially from the peripheral edge of said member, but the oil in the chambers F will be effectively prevented from escaping laterally into the slot 4 by reason of the fact that centrifugal force and the undercut or inwardly-inclined outer walls of said chambers combine or co-operate to hold the oil in the chambers F and exert pressure on said oil in a direction to force it positively through the ducts 3 leading to the crank pins.

Means is provided for automatically supplying oil to the grooves or chambers F in the member E, and in the present form of my invention the said means consists of an oil ring G' arranged so that the lower portion of said ring is normally submerged in the bath of oil in the bottom of the crank case of the machine, and the upper portion of said ring is positioned in the annular slot 4 in the member E in engagement with inclined distributing surfaces 6 on the member E which are disposed at such angles that the oil supplied to said surfaces 6 by the ring G' will travel by centrifugal force into the grooves F. The inclined distributing surfaces 6 are arranged in concentric relation with the axis of rotation of the member E and form continuations of the inner walls y of the chambers F. The ring G' is held in frictional engagement with the outwardly inclined distributing surfaces 6 by the weight of said ring, and in instances when the member E is provided with two opposed, open-sided oil chambers, as herein shown, one ring G' serves to supply oil to the two distributing surfaces 6 that co-act with said oil chamber. If desired, a roller 17 can be mounted on the bottom of the crank case of the machine, so as to lap over the ring G' and prevent said ring from getting out of position.

The walls of the cylinders of the machine are lubricated preferably by the oil thrown by centrifugal force from the joints at the ends of the connecting rod bearings 1. The joints at the ends of the connecting rod bearings 1 are also utilized to supply oil by centrifugal force to oil distributing members 13 in the upper portion of the crank case which are so constructed and arranged that the oil thrown against the underside of the said members from the ends of the connecting rod bearings 1 will flow downwardly on said members and finally drip from same into oil holes in the crank shaft bearings 15. In order to prevent excess oil that may be on the vertically-disposed surfaces 5 of the member E from being thrown upwardly into the cylinders of the machine, and thus causing the cylinders to receive an excessive supply of oil, an oil guard 16 is arranged over the rotatable member E. My improved lubricating system is applicable to single cylinder machines as well as to multi-cylinder machines.

Figure 3:
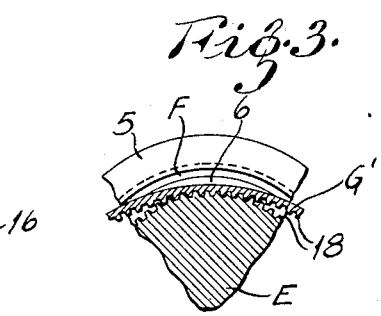
Figure 3 is a fragmentary sectional view, illustrating a feature that can be added to a lubricating apparatus of the kind shown in Figures 1 and 2.

If desired, co-operating teeth 18 can be formed on the inner side of the oil ring G' and on the bottom of the slot 4 in the member E, as shown in Figure 3, so as to positively rotate said oil ring and cause it to feed oil upwardly from the bath of oil in the crank case to the surfaces 6 of the member E.

A lubricating apparatus of the construction above described insures oil being supplied to the cylinders of the machine, to the main crank shaft bearings and to the bearings on the connecting rods that surround the crank pins, the oil being supplied under pressure to the crank pins at such a rate and in such a manner as to make it practicable to operate the machine at a high speed without liability of causing the cylinders to receive an excessive supply of oil. In my improved apparatus a fairly definite quantity of oil is supplied to the connecting rod bearings 1 by pressure produced by centrifugal force, and the oil which escapes from the ends of the connecting rod bearings is used to lubricate the cylinder walls and to lubricate the main bearings of the crank shaft. While I have herein illustrated the oil chambers F as being formed by annular grooves in the member E, I wish it to be understood that it is not essential that said chambers be continuous or of annular form, as they may consist of any kind of pocket, straight or curved, with undercut walls or other suitable inwardly-inclined surfaces disposed at an angle to the surfaces 5, as previously described.

Having thus described my invention, what I claim as new and desire to secure by Letters Patent is:

1. A lubricating apparatus, comprising a rotatable member provided with an oil chamber, open at one side and constructed so that the centrifugal force produced by the rotary movement of said member tends to cause oil in said chamber to be forced out of the same to a surface that requires lubrication, a distributing surface on said member disposed in concentric relation with the axis of rotation of said member, and arranged so that oil will be fed into the open side of said chamber from said surface by centrifugal force when said member is in rotation, and a ring arranged in engagement with said distributing surface and with a bath of oil for delivering oil to said distributing surface.

2. In a machine of the character described, a crank shaft provided with a crank pin, a connecting rod joined to said crank pin, a rotatable member on the crank shaft provided with an oil chamber open at one side, in which pressure is created by the centrifugal force produced by the rotary movement of said member, means for conducting oil from said chamber to said crank pin, an outwardly inclined distributing surface on said member arranged in concentric relation with the axis of rotation of said member, and a ring partially submerged in a bath of oil and arranged so that the inner side of the top portion of said ring bears upon said outwardly inclined distributing surface for delivering oil to the same.

3. A crank pin lubricating apparatus, comprising a rotatable member combined with the crank shaft that carries the crank pin and provided with an annular slot that has a concentric outwardly inclined distributing surface, an oil ring surrounding said member and arranged in said slot with the inner side of the top portion of said ring contacting with said outwardly inclined surface, the lower portion of said ring being submerged in a bath of oil, an oil chamber in one of the side walls of said slot disposed so that oil will be supplied to same from said distributing surface by centrifugal force, and a passageway leading from said chamber for supplying oil to the crank pin.

4. In a machine of the kind described, a crank shaft provided with a pair of crank pins, a rotatable member combined with the crank shaft and provided with a slot having oppositely inclined, concentric oil distributing surfaces, oil chambers in said member communicating with said distributing surfaces and constructed so that the centrifugal force produced by the rotary movement of said member tends to cause oil to be forced from said distributing surfaces into said chambers and thence through ducts which lead to said crank pins, an oil ring positioned in the slot in said rotatable member and having its top portion resting on said distributing surfaces, said ring being arranged with its lower portion submerged in a bath of oil in the crank case of the machine, and means for retaining said ring in operative position in said slot.

EDWIN H. STEEDMAN.